(12) United States Patent
Miaw et al.

(10) Patent No.: US 9,215,455 B2
(45) Date of Patent: *Dec. 15, 2015

(54) SYSTEM AND METHOD OF CALIBRATING A DISPLAY SYSTEM FREE OF VARIATION IN SYSTEM INPUT RESOLUTION

(71) Applicant: Scalable Display Technologies, Inc., Cambridge, MA (US)

(72) Inventors: Dennis Miaw, Slingerlands, NY (US); Rajeev J. Surati, Cambridge, MA (US); Kevin Amaratunga, Belmont, MA (US); Samson J. Timoner, Cambridge, MA (US); Tyler M. Johnson, South Boston, MA (US)

(73) Assignee: Scalable Display Technologies, Inc., Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/467,695

(22) Filed: Aug. 25, 2014

(65) Prior Publication Data

US 2014/0362234 A1    Dec. 11, 2014

Related U.S. Application Data

(63) Continuation of application No. 13/866,241, filed on Apr. 19, 2013, now Pat. No. 8,817,111.

(60) Provisional application No. 61/635,380, filed on Apr. 19, 2012.

(51) Int. Cl.
*H04N 17/00* (2006.01)
*H04N 17/02* (2006.01)
(Continued)

(52) U.S. Cl.
CPC ............. *H04N 17/02* (2013.01); *G06F 3/1446* (2013.01); *G09G 3/002* (2013.01); *G09G 3/20* (2013.01);
(Continued)

(58) Field of Classification Search
USPC ......... 348/189, 180, 181, 191, 135, 136, 745, 348/747, 808, 581
See application file for complete search history.

(56) References Cited

U.S. PATENT DOCUMENTS 5,475,447 A * 12/1995 Funado .......................... 348/745
5,483,299 A *  1/1996 Minoura ....................... 348/745
(Continued)

FOREIGN PATENT DOCUMENTS

JP    2004309562 A    11/2004
JP    2006003609 A     1/2006
(Continued)

OTHER PUBLICATIONS

Timoner, et al, "U.S. Appl. No. 13/296,864, System and Method for Calibrating a Display System Using Manual and Semi-Manual Tech", Nov. 15, 2011, Published in: US.

*Primary Examiner* — Jefferey Harold
*Assistant Examiner* — Mustafizur Rahman
(74) *Attorney, Agent, or Firm* — Loginov & Associates, PLLC; William A. Loginov (57) ABSTRACT

This invention provides a calibration system and method for multi-unit display systems without a need for switching the system input resolution/configuration of the display system while calibrating. This serves to avoid carrying out a re-synchronization step. As such, this system and method allows for increases speed and reduced likelihood of failure. This system and method also corrects the display system by providing an arrangement that employs a minimum of required changes so as to avoid any changes that can consequently affect the output image of the display system. Calibration of the system of display units occurs free of any changes to the input resolution and this resolution is maintained in a manner that resists change unless specifically required. Moreover, this system and method enables a resolution for the overall system that differs from the sum of the input resolutions of the discrete, individual display units in the collection.

20 Claims, 8 Drawing Sheets

(51) Int. Cl.
*G09G 3/20* (2006.01)
*G06F 3/14* (2006.01)
*G09G 3/00* (2006.01)
*H04N 9/31* (2006.01)

(52) U.S. Cl.
CPC ............. *H04N 9/31* (2013.01); *H04N 9/3147* (2013.01); *H04N 9/3188* (2013.01); *G09G 2300/026* (2013.01); *G09G 2320/0693* (2013.01); *G09G 2340/0414* (2013.01); *G09G 2340/0421* (2013.01)

(56) References Cited

U.S. PATENT DOCUMENTS

| | | | |
|---|---|---|---|
| 6,377,228 B1 * | 4/2002 | Jenkin et al. | 345/1.3 |
| 6,456,339 B1 | 9/2002 | Surati et al. | |
| 6,520,647 B2 | 2/2003 | Raskar | |
| 6,527,395 B1 | 3/2003 | Raskar et al. | |
| 6,677,956 B2 | 1/2004 | Raskar et al. | |
| 6,709,116 B1 | 3/2004 | Raskar et al. | |
| 6,715,888 B1 | 4/2004 | Raskar et al. | |
| 6,729,733 B1 | 5/2004 | Raskar et al. | |
| 6,733,138 B2 | 5/2004 | Raskar | |
| 6,755,537 B1 | 6/2004 | Raskar et al. | |
| 6,764,185 B1 | 7/2004 | Beardsley et al. | |
| 6,781,591 B2 | 8/2004 | Raskar | |
| 6,793,350 B1 | 9/2004 | Raskar et al. | |
| 6,804,406 B1 | 10/2004 | Chen | |
| 6,811,264 B2 | 11/2004 | Raskar et al. | |
| 6,834,965 B2 | 12/2004 | Raskar et al. | |
| 7,001,023 B2 | 2/2006 | Lee et al. | |
| 7,031,579 B2 * | 4/2006 | Sisodia et al. | 385/120 |
| 7,137,707 B2 | 11/2006 | Beardsley et al. | |
| 7,154,395 B2 | 12/2006 | Raskar et al. | |
| 7,242,818 B2 | 7/2007 | Beardsley et al. | |
| 7,252,387 B2 | 8/2007 | Raskar et al. | |
| 7,292,269 B2 | 11/2007 | Raskar et al. | |
| 7,355,583 B2 | 4/2008 | Beardsley et al. | |
| 7,421,111 B2 | 9/2008 | Dietz et al. | |
| 7,567,256 B2 * | 7/2009 | Hollowbush et al. | 345/618 |
| 2006/0012714 A1 * | 1/2006 | Louie et al. | 348/581 |
| 2008/0246781 A1 | 10/2008 | Surati et al. | |
| 2011/0211080 A1 * | 9/2011 | Silverbrook | 348/207.2 |

FOREIGN PATENT DOCUMENTS

| | | |
|---|---|---|
| JP | 2007147852 A | 6/2007 |
| JP | 2010134396 A | 6/2010 |

* cited by examiner

SYSTEM AND METHOD OF CALIBRATING A DISPLAY SYSTEM FREE OF VARIATION IN SYSTEM INPUT RESOLUTION

RELATED APPLICATION

This application is a continuation of co-pending U.S. patent application Ser. No. 13/866,241, entitled SYSTEM AND METHOD OF CALIBRATING A DISPLAY SYSTEM FREE OF VARIATION IN SYSTEM INPUT RESOLUTION, filed Apr. 19, 2013, which claims the benefit of U.S. Provisional Application Ser. No. 61/635,380, filed Apr. 19, 2012, entitled SYSTEM AND METHOD OF CALIBRATING A DISPLAY SYSTEM FREE OF VARIATION IN SYSTEM INPUT RESOLUTION, the entire disclosure of each of which applications is herein incorporated by reference.

FIELD OF THE INVENTION

This invention is related to displays, and more particularly display systems made up of one or more display units and calibration systems and methods for the same.

BACKGROUND OF THE INVENTION

Projectors, flat panel displays and other video display devices do not always synchronize reliably to input video signals. When a video signal changes, it can force a re-synchronization of a display unit such as a projector or LCD (flat) panel. That synchronization sometimes fails and the display is no longer able to find a video signal. This can be very inconvenient where the display system is used at an event or meeting where high reliability is desired and/or skilled operators may be unavailable. The loss of the video signal is even more likely to occur in a plurality of display units organized in a collection that is synchronized together. Thus, it is desirable to avoid the need to perform a re-synchronization task so as to avoid losing the signal. Additionally, synchronization of video signals is a relatively slow process, and thus avoiding re-synchronization can desirably increase the speed of a display system with one or more display units.

For a display system consisting of one or more display units, there are a variety of techniques for altering the input source video signal to one or more of the display units. For example, adjustments can be made to the signal to vary the displayed image's warp and/or scale, blend, color correction, and/or the pixel overlap/bezel correction change. Likewise, changes can be made to the operating point of the equipment used, which can be termed the optical mechanical thermal and electronic (OMTE) parameters. US published Patent Application No. 20080/246781 A1, entitled SYSTEM AND METHOD FOR PROVIDING IMPROVED DISPLAY QUALITY BY DISPLAY ADJUSTMENT AND IMAGE PROCESSING USING OPTICAL FEEDBACK, by Rajeev J. Surati, et al., the teachings of which are expressly incorporated herein by reference as useful background information, describes the optical mechanical thermal and electronic (OMTE) parameters of a display. The OMTE parameters may be modified under computer or manual control and then an appropriate mapping function may make transformations to the displayed image source signal that work together with the OMTE changes.

A variety of devices and/or modalities can be employed to make changes to the source signal including, but is not limited to, computers, with a driver/software that can perform, a sub-set of corrections to the source signal being created, video wall controllers, warping boxes, scaling boxes, EDID boxes, video wall controllers, and/or the display units (e.g. projectors) themselves. Any of the contemplated devices can be adapted to change the appearance of the final viewed image—desirably to provide a better overall appearance and (where multiple display units are used) consistency across blended images. However, the use of such devices and other alterations to the source signal raises the risk of loss of video synchronization and/or reduced system speed/performance.

The most common time when the system is changed is during calibration. Whether the system is manually, semi-manually or automatically calibrated, the settings are typically changed one or more times.

Sometimes changing the pixel overlap (for example for projectors) or the bezel correction (for flat panels) causes a re-synchronization. Sometimes changing the warp and/or changing the blend can cause a re-synchronization. It is therefore desirable to be able to make changes to the system without causing a display unit to re-synchronize, or to re-synchronize as little as possible.

Another disadvantageous scenario is when an application (e.g. an automated or manual calibration program) desires to reset a parameter, such as overlaps, and may lack access to set this parameter. In such cases the system may continue operating with a poorly set parameter, negatively affecting image quality. The ability to set a parameter overlap once through some other method and eliminate the need to reset said parameter is thus highly desirable.

In addition, it is often desirable to set the input resolution of the display units in the system to essentially match the aspect ratio of the displayed image. This can involve re-synchronization in an effort to achieve the correct resolution, again inviting all the risks and disadvantages to such a state.

Thus, it is highly desirable to avoid re-synchronization, particularly during runtime operation of the display system, and more generally to provide an arrangement that avoids changing parameters that can potentially slow down the calibration process and possibly change the system appearance and/or performance in one or more subtle ways (e.g. providing each unit with slightly different timings, etc.)

SUMMARY OF THE INVENTION

This invention overcomes disadvantages of prior art by providing a calibration system for use with, illustratively, multi-unit display systems that is generally free of a need for switching the system input resolution/configuration of the display system while calibrating. This serves to avoid carrying out a re-synchronization step. As such, this system and method allows for increases speed and reduced likelihood of failure. This system and method also corrects the display system by providing an arrangement that employs a minimum of required changes so as to avoid any changes in display system settings that can consequently affect (i.e. negatively affect) the output image of the display system. In an illustrative embodiment, the system and method is able to allow calibration of the system of display units free of any changes to the input resolution and this resolution is maintained in a manner that resists change unless specifically required. Moreover, this system and method enables a resolution for the overall system that differs from the sum of the input resolutions of the discrete, individual display units in the collection.

In an illustrative embodiment, a system and method for performing calibration on a collection of one or more display units with a system input resolution different from the total resolution of the display units includes: (a) changing, using a process or processor, an input video signal to calibrate the system, free of (without) changing a resolution of the input video signal so as to maintain a current input resolution thereof; (b) during the calibration, using a change by a process or processor in at least one of a plurality of settings (e.g. warp, blend, OMTE parameters or other variable factors that do not change resolution or risk a re-synchronization) to at least partially compensate for the maintaining of the current input resolution; and (c) calculating with a process or processor a new system correction using the data collected in step (b) and compensating for any artifacts introduced to the system in step (b). The display units can be flat panel displays (based on LCD and/or LED technology, etc.), rear projection displays, front projectors, raster scanned displays, and the like. Illustratively, a warp can used to scale the image pixels across the entire system, and/or calibration pixels are sent to each one of the display units at a time using a warp. Each one of the display units in the system can be blanked out at a time using a blend, and/or by using an electronic or mechanical shutter placed in front of the projected light or that is part of the projector. Illustratively, an image on at least one of the display units can be frozen during the calibration. Also, a location of a control point can be added to the input video signal of the system. Illustratively, when the above-described settings include warp, the values of the warp (i.e. the "warps" of the display) that are regularly in use in are maintained a "set" state, whereby a number of times that the state of the warp is changed is minimized. When the above-described settings include color correction (or blend), the values of the color correction that are regularly in use in are maintained a "set" state, whereby a number of times that the state of the color is changed is minimized.

It should be clear that the above-described system and method desirably allows the input resolution of the system to be set to match the aspect ratio of the displayed image. This system and method avoids the need to either calibrate with overlaps off then turn on overlaps, thereby incurring the effects of re-synchronization. Alternatively, an approach in which the system is calibrated, and then it is operated with overlaps off—which results in elongation/compression artifacts—is avoided.

BRIEF DESCRIPTION OF THE DRAWINGS

The invention description below refers to the accompanying drawings, of which.

DETAILED DESCRIPTION

Figure 1:
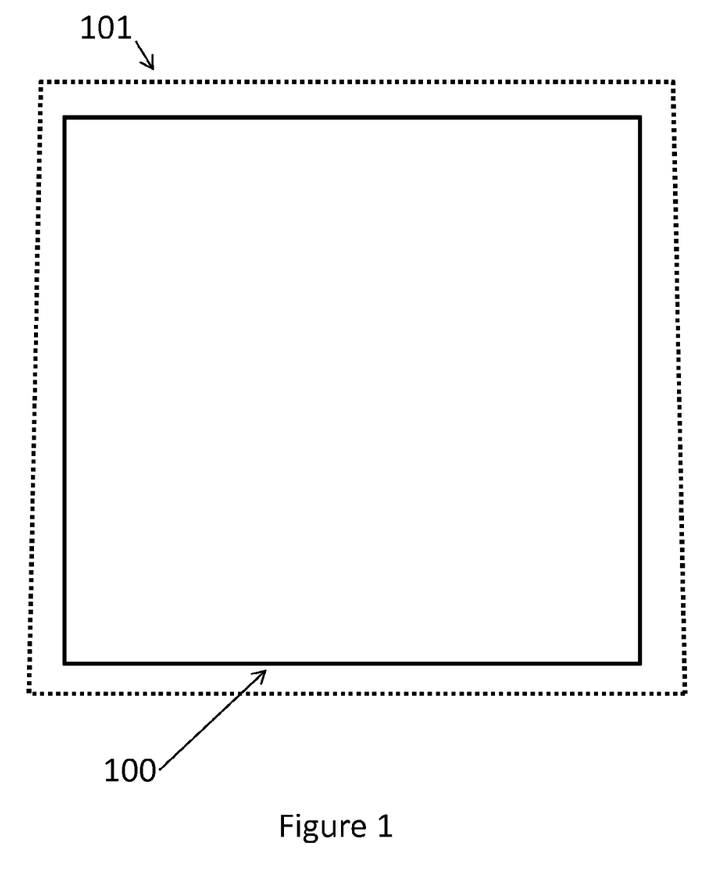
FIG. 1 is a block diagram of a single of projector keystoned on a screen where the input system resolution is changed to be optimized for the display.
Figure 2:
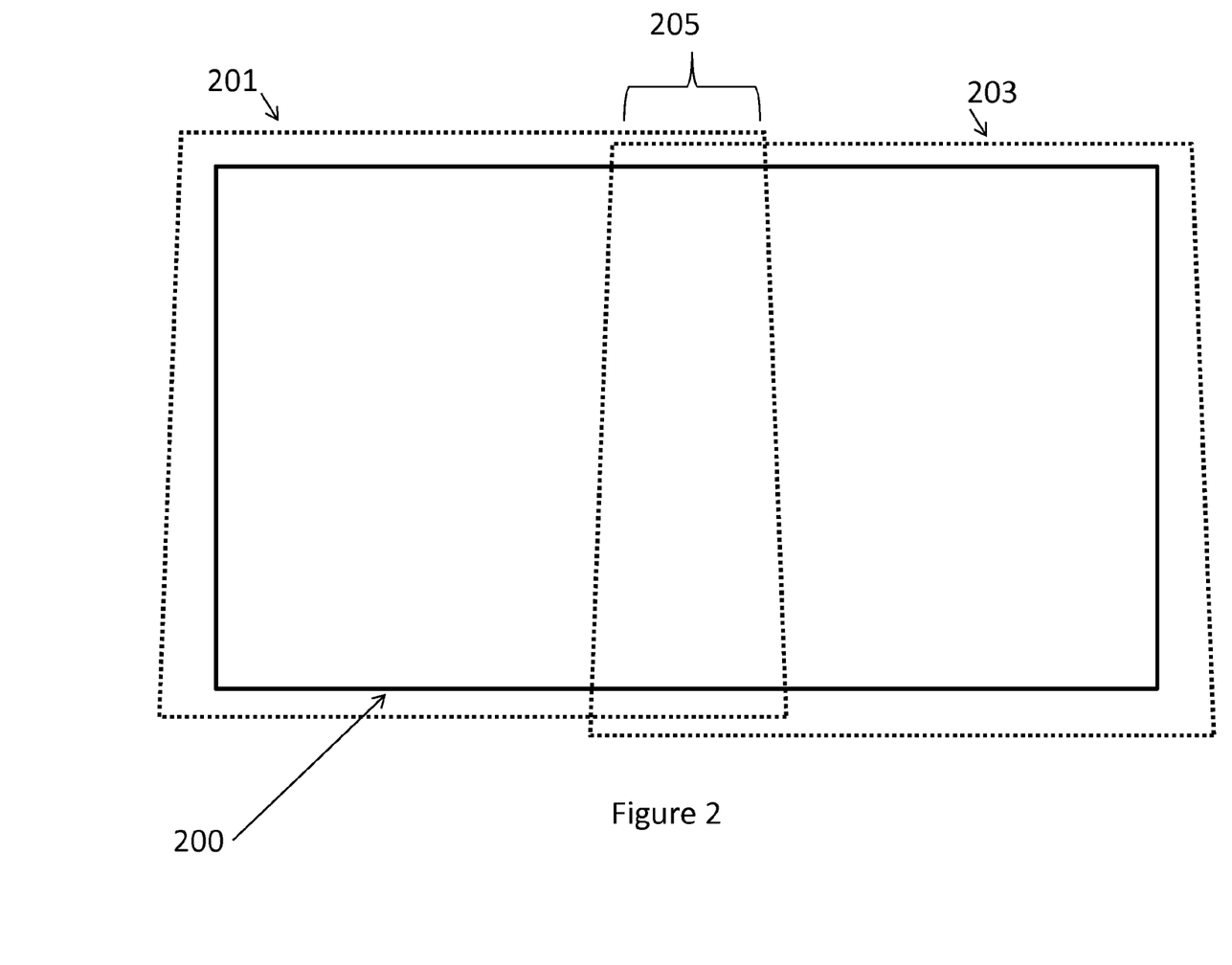
FIG. 2 is a block diagram of two projectors keystoned on a screen where the input system resolution is changed to be optimized for the display.

FIGS. 1 and 2 are respectively a single and dual-projection display, which are provided by way of example to describe the illustrative embodiments below, and more particularly to demonstrate the concept of the desired input resolution of the system.

FIG. 1 shows the outline 101 of a projector over-projecting the outline of a screen, 100. Some fraction of the projector does not actually hit the screen, so that the number of pixels that are actually on the screen are less than the full resolution of the projector. If the projector resolution were 1024 by 768, perhaps approximately 950 by 700 actually hit the screen. Thus, the overall system resolution for the display will be closer to 950 by 700 than 1024 by 768.

It is desirable that the input resolution used in the system have several properties. One significant property is often termed "square" pixels. If the video to be shown on the system defines a 4×3 ratio of width to height, then it is typically desirable for the physical screen to also define a 4×3 ratio. If the screen does not define this ratio, then the input video is either stretched vertically or horizontally. Where the screen defines the (approximately) same ratio of width to height as that of the input video ensures that objects that are square in the original video appear square on the screen.

A second significant property is the attempt to match the input resolution of the system with the modulation transfer function of the system. If the input resolution is too low for the system, it does not make good use of the pixels available in the display. In this case, the display is not showing all the detail in the final image that it is capable of showing. Conversely, if the input resolution is too high for the system, fine details in the input video will not be visible in the final image. It is therefore desirable to generate and project pixels of approximately the correct resolution and size.

A third significant property is often the aspect ratio of the input video. Particular ratios of height to width are sometimes desirable.

Typically, these properties, and others, lead to trade-offs therebetween. A user is generally faced with choices on how to set each property, and how much weight each property is given by the display system.

In this case of the outline of exemplary screen 100, if the ratio of width to height of the screen 100 were approximately 1.2, an input resolution to the system of 840 by 700 could be desirable. This provides an actual ratio of 1.2, which essentially meets the square pixels property. It approximately makes use of all the 700 pixels vertically, and uses as many of the 950 pixels horizontally as generally possible, while still yielding essentially square pixels. An alternate technique is to ensure that the input resolution has a specific ratio of width to height. In this case, one might not use the entirety of the available screen area to achieve that ratio on the screen, and would use a different input resolution.

FIG. 2 shows the outline of another exemplary screen 200, with the outlines of two projectors, 201 and 203, shown overlapping. In this case, the projectors 201 and 203 overlap on the screen in overlap region 205. The projectors also overfill the screen, extending beyond its edges.

The effective resolution of the system will be roughly the total resolution of the projectors that hit the screen, subtracting out the overlap region. The desired input resolution of the system can be calculated, as in FIG. 1, optimizing for square pixels and system resolution, possibly the desired ratio of the input signal, or other factors.

Figure 3:
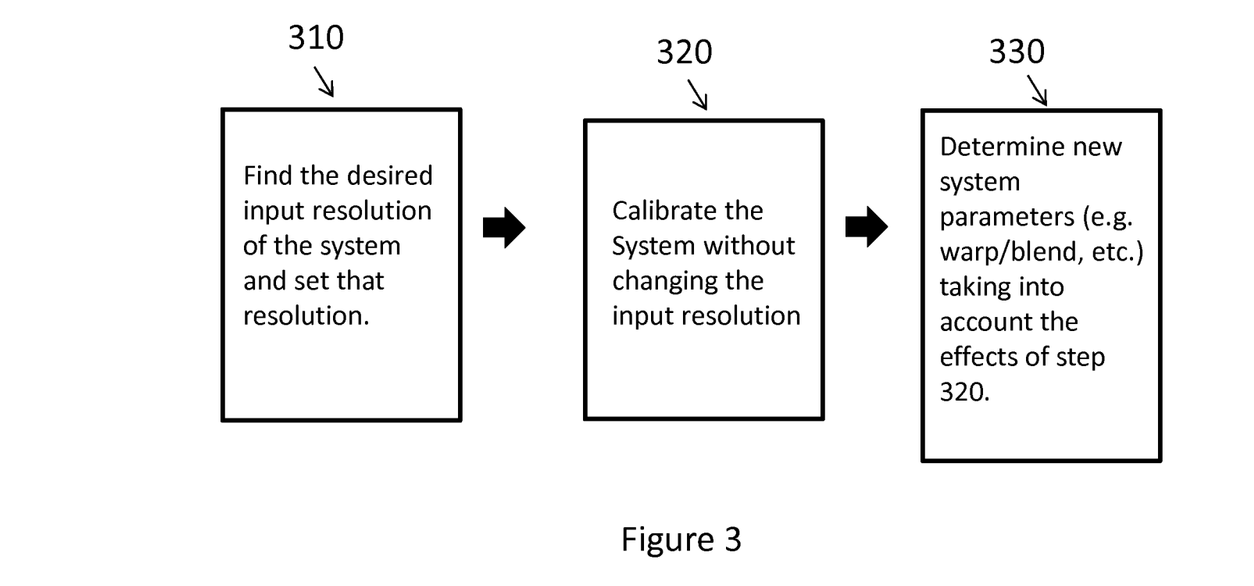
FIG. 3 is a flow diagram describing setting up a system and calibrating it without changing the input resolution of the system.

FIG. 3 is a block diagram that is used to calibrate the systems in FIG. 1 or 2 in accordance with an illustrative embodiment. In step 310, the desired input resolution of the system is chosen. This is chosen by optimizing the desired properties of the input video given the system. Without limitation, this step (310) can be performed by a wide variety of different methods (i.e. processes, processors and/or procedures). Some illustrative methods include estimating the input resolution automatically, using a camera to estimate the estimated modulation transfer function of the system. Alternatively the optimization calculation can be performed with a manual method. The calculation can be done by modeling the system such as in a computer-aided design (CAD) software package. Or, it can be done by a user moving sliders (on a computer graphical user interface (GUI) display that drives the display characteristics (not shown, but well-known in the art) and subjectively deciding what displayed/projected image exhibits the best characteristics.

Notably, once the input resolution is determined and/or known, subsequent calibrations are performed without (free-of) changing (i.e. altering, varying, etc.) the input resolution of the system, step 320. "Calibration" is a process that is well-known in the art. Automatic calibration is described in U.S. Pat. No. 6,456,339, entitled SUPER-RESOLUTION DISPLAY by Rajeev J. Surati, et al., the teachings of which are expressly incorporated herein by reference as useful background information. In those teachings, a light sensor is used to detect patterns of light from the projector, and used to find the mapping from the input imagery in the system to the screen, and a correction (e.g. warping, color correction, intensity correction) to the input imagery for each display unit to make the overall system appear more desirable (e.g. geometrically correct, fitting the screen well, near uniform intensity and color, etc.) Many techniques are contemplated for use in finding the correction including Manual and Semi-manual algorithms such as those in U.S. patent application Ser. No. 13/296,864, entitled SYSTEM AND METHOD FOR CALIBRATING A DISPLAY SYSTEM USING MANUAL AND SEMI-MANUAL TECHNIQUES, whose teaching are included herein. In that application, correspondences are found between projectors that, with the addition of modeled data, can be used to find a correction to the input video to make the overall system appear more desirable.

Step 320 can be performed using a variety of methods, and/or devices. An embodiment for performing step 320 is described in FIG. 4. In step 420, a warp is used to stretch the input pixels across the display. As an example, in FIG. 1, if the input resolution of the system were 840 by 700, the pixels can be scaled and re-sampled to 1024×768 based upon a set value for the warp. In the case of the FIG. 1 example, the procedure could stretch half the input resolution of the system across the first projector and the other half on the second projector. In step 422, an automatic calibration could be performed with a camera and associated calibration patterns can be employed to automatically calibrate the system.

Figure 4:
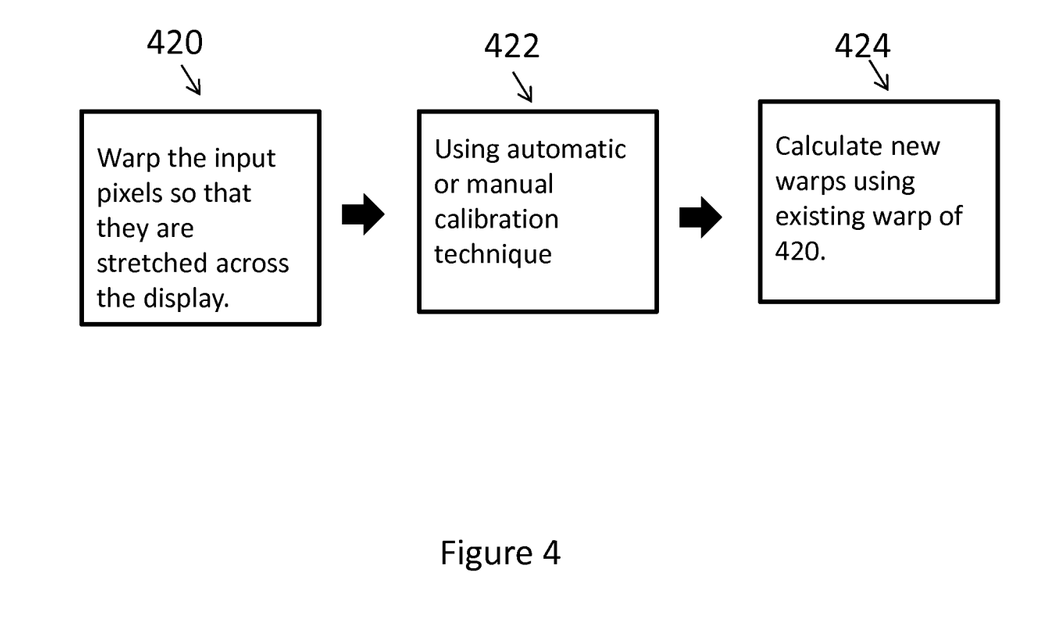
FIG. 4 is a flow diagram describing one method of calibrating using warps to avoid changing the input resolution to the system.

In step 330, the new system parameters are calculated using the information gained from step 320. In the embodiment of FIG. 4, this is performed at step 424. New warps for the system are calculated using the warps found during the calibration, taking into account the warps that were on (i.e. that were "set" so that these warps/warp values were operational and in use) during calibration and the effect of those warps on the final image.

Figure 5:
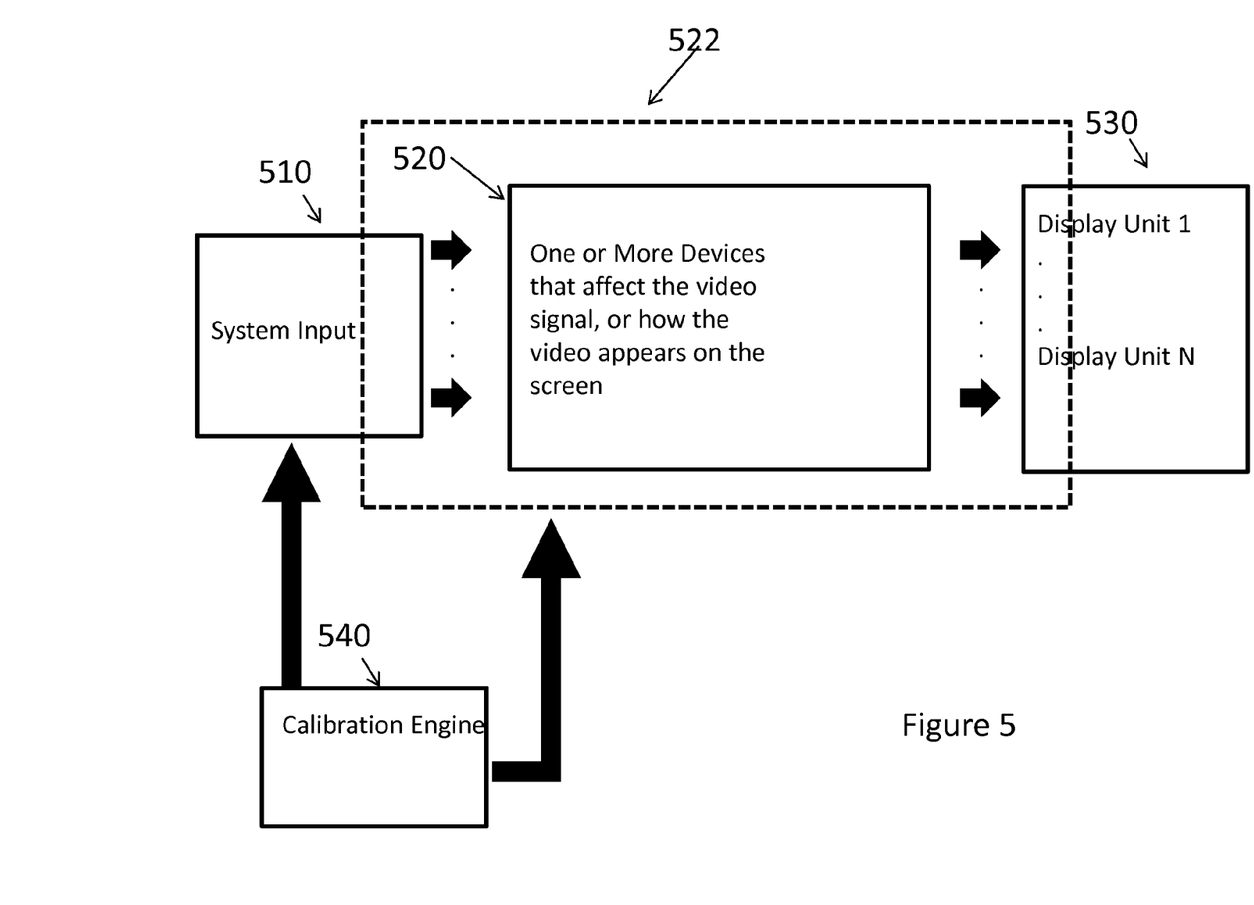
FIG. 5 is a system diagram of a system that shows operation of the system setup in FIG. 3.

FIG. 5 demonstrates the diagram of a system that implements the block diagram of FIG. 3. The system input, 510, is fed into a video or pixel pipeline 520. This input thereby becomes input to one or more display units (1-N 530 for display thereby.

Without limitation, in various embodiments, multiple cables can be used to transfer the video signal between the system input 510 and the video or pixel pipeline 520. Similarly multiple cables can be used to transfer the video signals between the pipeline 520 and display units (1-N) 530. This possible arrangement is indicated in FIG. 5 by multiple arrows associated with each of multiple cables/transmission paths to multiple, respective, units. Though, without loss of generality, the video signal can be carried in one cable, or through a daisy-chained system of cables, in which one cable interconnects to a single device, and which is then duplicated and interconnected to the next device.

Dashed-line box 522 indicates that the boundaries of 520 are potentially not aligned with the physical boundaries of the equipment being used. That is, the devices that affect the video signal can include the system for generating the video signal itself, and the one or more display units. For example, there can be a warp and blend processor chip (not shown, but known in the art) in the projector, rather than in a separate warping box. Also, there can be a computer generating the video input signal in 510, but the driver for that computer (not shown, but known in the art) can allow warping, blending and overlaps—so that the corrections are effectively performed in the same device that generates the video signal.

Box 540 shows the calibration engine. The calibration engine can be software, or an electronic processing device/appliance, or some-combination thereof. The engine sends in input video to the system to be calibrated. Without limitation, this could be a manual, or automatic, or semi-manual calibration. To perform the calibration, the calibration engine also changes the parameters of 520, the one or more devices that affect the video signal and how the video signal appears on the display screen. The calibration is thereby performed, and the new parameters are calculated as described in FIG. 3.

There are numerous concrete examples of the pixel pipeline 520 described in FIG. 5. One example is a video driver on a computer that can do overlaps, with boxes that can do warping and blending placed on its outputs. A second example is a box that can report the desired input resolution to the system generating video using Extended Display Identification Data (EDID) communication according to the art, and then divides up the signal to a variety of outputs that go to projectors, with warp and blend processor chips in them. A third example is a commercially available graphics card that can perform overlaps vertically with two outputs in a manner known in the art. Each output is fed into a known processor "box" that can perform overlaps horizontally, whose outputs are then fed into known warping boxes, and then into projectors. A fourth example is a computer having two outputs transmitted to a video wall controller. The video wall controller tells the computer to send half of the system input resolution to each input using EDIDs. The system then continues to warping boxes, and then to projectors. There are many other types of devices that can be used to implement the illustrative pipeline 520. Without limitation, those include: warping and blending boxes, keystone correction boxes, color correction boxes, scaling boxes, and video wall controllers. And, there a many parameters that can be used in association therewith, according to known techniques.

Figure 6:
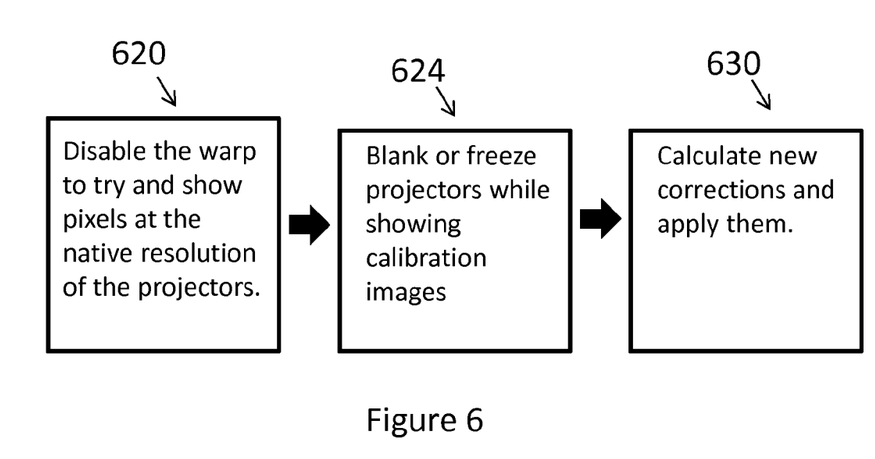
FIG. 6 is a flow diagram describing one method of calibrating using warps to avoid changing the input resolution to the system, and using blanking methods in the projectors.
Figure 7:
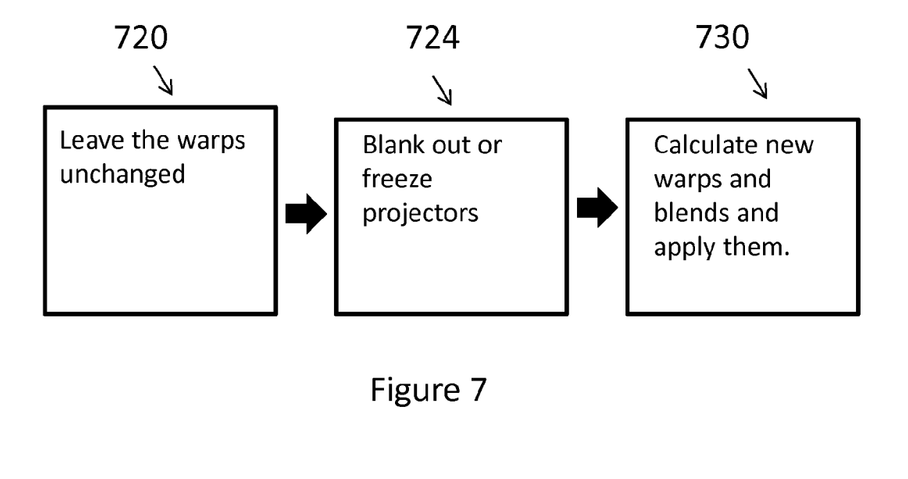
FIG. 7 is a flow diagram describing one method of calibrating using warps to avoid changing the input resolution to the system, and changing the warps as little as possible.

FIGS. 6 and 7 describe two other methods of calibration that employ processes/procedures methods differently than described in connection with FIG. 4. In FIG. 6, a method is provided that uses blanking of the projector. In this case, the current warp is disabled in step 620. The goal is typically to try and show pixels as close as possible to the native resolution of the projectors, so that there are no artifacts (i.e. substantially or completely free-of artifacts) caused by warping, that would entail further processing in the subsequent step. Pixels are duplicated on the screen in the overlap region. In the example of FIG. 2, this duplicative area would be in region 205. It is difficult to manually or automatically calibrate in such systems, as both a viewer and camera view two nearly identical patterns overlapping in this region. One illustrative method to solve the problem is to blank one of the projectors as provided in step 624. Blanking can be accomplished by many methods or processes including using a blend map to set the intensities of every pixel to 0, using a shutter in the projector, or using a built in capability in a projector to put up a blank image. Shutters can be implemented electronically or mechanically using known techniques. An alternate method is to freeze the image displayed by one of the projectors. It is noted that some commercially available projectors in development will have the ability to freeze the current image. This can be very useful particularly when manually calibrating and positioning control points provided by one projector on top of control points provided by another projector, such as described in commonly assigned U.S. patent application Ser. No. 13/296,864, entitled SYSTEM AND METHOD FOR CALIBRATING A DISPLAY SYSTEM USING MANUAL AND SEMI-MANUAL TECHNIQUES, by Samson Timoner, et al., the teachings of which are expressly incorporated herein by reference as useful background information. Once relevant information for a calibration has been collected, the new settings for warps/warp values and blends and color corrections, and any other appropriate corrections can be applied to the system via the projector's display driver(s) and associated software/hardware (step 630).

FIG. 7, details a slight modification of FIG. 6 according to an embodiment adapted to handle situations when changing the warp is time-consuming, or likely causes a re-synchronization. In this case, the warp from the previous calibration procedure (the "current warp) is left on (i.e. remains "set") while a new calibration procedure is attempted. The above-described blanking and/or freezing methods/processes of FIG. 6 can be employed during the new calibration procedure. In the new calibration procedure, the system and method illustratively compensates for the existing/current warp. In particular, not all of the output video on the projector will be filled, so it can be desirable to extrapolate past the visible area from the warp. If no physical movement has occurred in either projector then, this type of extrapolation is typically unnecessary. For small projector movements, the extrapolation can be performed precisely.

Note that (similarly to the embodiment of FIG. 7 where the current/warp value remains unchanged) it is contemplated that other calibration parameters/settings can also be set to remain unchanged in various embodiments. One of illustrative value that can remain unchanged, and in its "current" set state, is color calibration. As the color calibration is often nearly identical from one calibration procedure to another, leaving it in place can save the time of disabling it, and potentially add value in that the system is nearly perfectly calibrated from the start.

Figure 8:
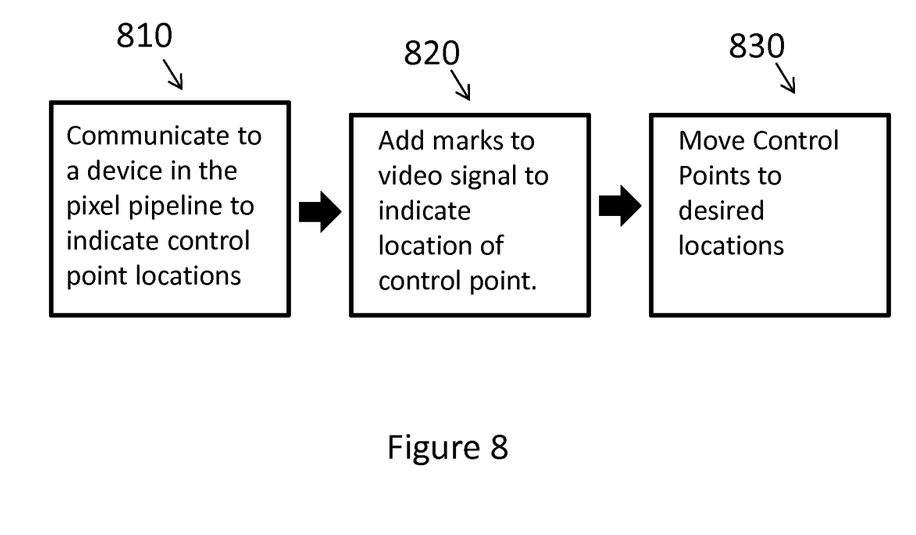
FIG. 8 is a block diagram describing adding control points to the video in the pixel pipeline.

FIG. 8, is system diagram for adding control points to the input video for the calibration procedure/process. In some circumstances, the control points can be added to the input video, but in other circumstances this process can be challenging. During calibration, in many circumstances it is therefore useful to be able to add markers to the input video signal so that that the display image can be moved during calibration. In automatic and manual calibration, the goal is often to move the markers to known locations on the display units. Without limitation, it can also be useful with the aid of an appropriate algorithm/process to find locations where neighboring projectors overlap. In FIG. 8, the process begins communicating with a device in the pixel pipeline 810 the location of one of more control point locations. The device is part of the pipeline 520 shown in FIG. 5, or more generally box 522. In step 820, the device in the pixel pipeline shows the control points on the screen by adding exemplary "x"s or other fiducials to the video signal and resulting display image. In step 830, a user or another mechanism moves the fiducials until they land on the correct location.

Figure 9:
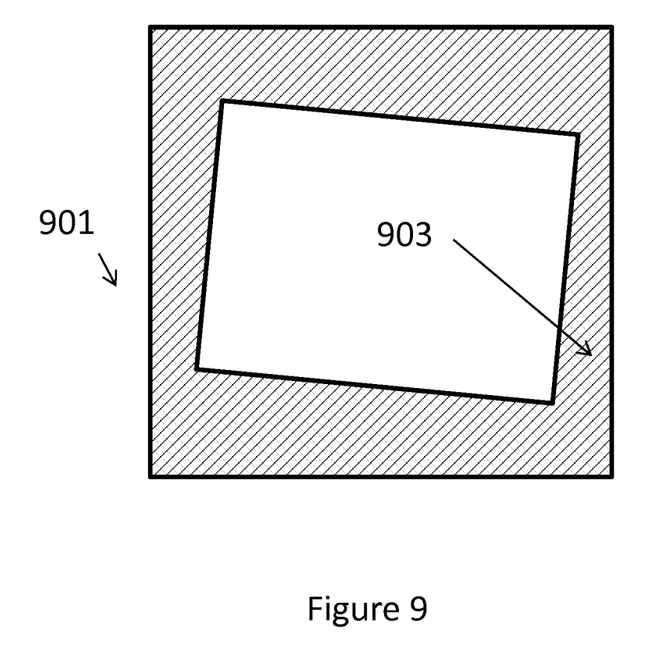
FIG. 9 is a block diagram describing a system where a single flat panel display has been partially blocked to create a rectangular fill region where the system input resolution is changed for the display.

FIG. 9 illustratively describes a basic example of using the methods of FIG. 3 with a flat panel display. In this case there is a flat panel display unit 901, which is blocked by mask 903, which includes a rectangular cutout in it. Similar to the embodiment described above, the system input resolution is not the same as the display resolution. As described in FIG. 3, we find the desired input resolution of the display by optimizing the properties of the display that interest the user. Once that input resolution is sent to the system, the methods of FIG. 4 can be employed in an embodiment to perform calibration. For example, the system and method can warp the input resolution across the entire panel, calibrate for color and intensity within the display unit as well as the rotation and translation of the rectangle using a warp. The system can then produce a new warp taking into account the warp that was introduced during calibration.

It is expressly contemplated that additional embodiments can be provided in accordance with the broad teaching for this Description. The embodiments described above are adapted to apply to various implementation details discussed herein. However other embodiments (for example those that allow further parameters to remain unchanged during calibration) can be provided in accordance with the teachings herein using appropriate software and hardware.

In a further example of an operational system, a computer (e.g. a PC or server) is provided with a driver having the capability to perform overlap, warps, blends, and in some examples, color changes. A calibration program (automatic or manual) can run on the computer. During calibration, the overlaps are not changed (i.e. remain free of change from the current set state). Instead a warp is used to stretch the input video signal it across the collection of projectors. This type of warp illustratively allows unique pixels to be placed at each location. However, since there are insufficient pixels provided by the one projector to fit across the entire display surface/screen (based upon the pixels' normal/native height and width, and thus the individual pixels are each stretched (typically in the width direction in the example of a "wide" display across the projectors' display area. For automatic calibration, patterns are generated by available software on the computer, and displayed for a viewing camera or other optical sensor to capture and then manipulate settings via the software using the captured image(s) of the display. For manual calibration, control points are moved around on the screen by a user. The calibration images are transmitted into the input video, and when calibration is complete, the warp is calculated by compensating for the pixel stretch that was performed during calibration.

The above illustrative process can also be performed with a system that includes a computer having a video signal input to a "box" that includes hardware and/or software capable of warping the pixels from the input video signal. This warped signal is then output by the box to the projectors. In this case, the box is performing the warping in the same manner as the above-described computer driver.

Other warp processes and techniques are also contemplated herein. In an embodiment the video for a first output (Output 1) is warped onto a second output (output 2), and vice versa. This technique still allows the projectors to display overlapping pixels, but unlike a standard overlap, the pixels in each region from each projector are not the same. One can then use known methods and techniques from the literature (such as those described by Aditi Mujundar) to provide patterns that can be differentiated by a viewing camera. In this manner calibration can proceed using the produced warped images.

Another warp that can be generated in illustrative embodiments to achieve the desired effects is a warp that flips the display image from left to right. Yet another illustrative warp is one that warps the entirety of a projector display to a single pixel, thereby effectively blanking a projector.

In another operative example, a display port router can be provided, interconnected to one or more projectors that each include warping processor chips. In a display port router, video signals are initially sent into the router and individual outputs subscribe to certain portions of the incoming video. This arrangement is functionally similar to a video wall controller. In such an embodiment, the warping processor chip in a particular projector provides a warp that blanks the received signal from the router. Alternatively, the system and method can operate to change the area of the input video display to which the projector subscribes (based on the router). Illustratively this allows the system to swap which pixels are assigned to which location on the display. Notably, this technique is similar to the function of a video wall controller, The OMTE parameters are similarly useful to address projectors individually in an operative example. The display color of a projector can be changed so that a user and/or a camera can readily discern the respective displays of different projectors. By way of example the contrast setting ("knob") on a projector can be minimized (i.e. turned all the way down) to effectively blacken that projector. Mechanical shutters located in the optical path of the projector can also be employed to blacken the projector. Blend maps in the projectors work can also be used to effectively black out a projector display. In another example, the voltage to a projector lamp can be turned down so as to provide it with significantly reduced power, thereby causing a blacking effect to its display. Defocus of one or more projectors, by changing the lend setting or the physical focal distance of the projector can also allow the display of the one or more projectors to be differentiated from others in the collection. Some projectors also provide the capability to display certain types of internally stored images, such as a black image, and setting such parameters on a projector with that capability can be useful in the illustrative calibration procedure.

In summary, it is contemplated that, while blacking out a projector is a very convenient technique for differentiating one projector from another, it is not the only technique that can be employed. Differentiating by projector color is an effective technique, as is differentiating by display intensity. Defocusing the projector can also prove sufficient for a camera (or other modality in a calibration process) to differentiate projectors.

As described above freezing a projector input can also be employed during the illustrative calibration process. In an operative example, this entails sending a "freeze" command to a system having this capability, to thereby direct the system to generate and display a black image and then enable the projector to subsequently maintain its current pixels (i.e. freeze the "black" image). Alternative, the freeze function can be employed by the system to first generate and display a marker for manual or semi-manual calibration, and then retain that marker on the display in a fixed state without (free of) affecting the displays of any other projector(s).

The system can also effectively employ blends and/or color maps during calibration. In an operative example, the system can temporarily display black on a projector by setting the blend map to 0 on the associated display driver.

Another illustrative embodiment contemplated herein includes a single computer having a display signal output that drives a video display screen and also drives a separate control monitor having a different set of images, than those of the main "wall" display screen. For example, the images on the control monitor can relate to parameters and settings of the display screen projector(s) or access by users to manipulate the display screen content (e.g. a report or presentation), rather than the content provided by the display screen. This type of system can afford many of the challenges contemplated above. It can be desirable to set display parameters on the control monitor. As such, certain above-described functions, such as blanking out the control monitor during calibration, or to warping pixels away from the control monitor and onto the wall display screen.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. For example, as used herein the terms "process" and/or "processor" should be taken broadly to include a variety of electronic hardware and/or software based functions and components. Moreover, a depicted process or processor can be combined with other processes and/or processors or divided into various sub-processes or processors. Such sub-processes and/or sub-processors can be variously combined according to embodiments herein. Likewise, it is expressly contemplated that any function, process and/or processor here herein can be implemented using electronic hardware, software consisting of a non-transitory computer-readable medium of program instructions, or a combination of hardware and software. Also, while the principles of the illustrative embodiment are shown typically with a collection of displays that include a plurality of discrete units, it is expressly contemplated that the principles described herein can be used in a single unit, and thus the word "collection" can be taken broadly to include a single display unit—potentially (but not necessarily) having differing regions of the display that are handled in accordance with system and method for calibration herein. Accordingly, this description is meant to be taken only by way of example, and not to otherwise limit the scope of this invention.

What is claimed is:

1. A method calibrating a system of display units, the method comprising:
   selecting a first resolution associated with the system of display units;

adjusting a first setting of the input video signal while maintaining the selected first resolution;

at least partially compensating for maintaining the selected first resolution using the adjusted first setting; and calculating a system parameter associated with the system of display units based in part on the compensating step.

2. The method as in claim 1 wherein step of at least partially compensating includes applying a warp.

3. The method as in claim 1 further comprising using a warp to scale image pixels across the entire system.

4. The method as in claim 1 further comprising sending calibration pixels to each one of the display units at a time using a warp.

5. The method as in claim 1 further comprising blanking out each one of the display units at a time using a blend and or warp.

6. The method as in claim 1 further comprising blanking out each one of the display units at a time using one of an electronic shutter or a mechanical shutter.

7. The method as in claim 1 further comprising freezing an image on at least one of the display units during the calibration.

8. The method as in claim 1 further comprising adding a location of a control point to the input video signal of the system.

9. The method as in claim 1 wherein the first setting comprises warp, and step (b) further comprises maintaining values of the warp that are regularly in use in a set state, whereby a number of times that a state of the warp is changed is minimized.

10. The method as in claim 1 wherein the first setting comprises color correction, and step (b) further comprises maintaining values of the color correction that are regularly in use in a set state, whereby a number of times that a state of the color correction is changed is minimized.

11. The method as in claim 1 wherein the display units are projectors.

12. The method as in claim 1 wherein the display units are flat panel displays.

13. The method as in claim 1 wherein the first setting includes at least one of warp, blend and OMTE parameters.

14. A system for performing calibration on a collection of one or more display units with a system input resolution different from the total resolution of the display units, the system comprising:

a driver that adjusts a first setting of the input video signal while maintaining a selected first resolution;

means, during the calibration, for at least partially compensating for maintaining the selected first resolution using the adjusted first setting; and means for calculating a system parameter associated with the system of display units based in part on the compensating step.

15. The system as in claim 14 wherein the means for using is constructed and arranged to apply a warp.

16. The system as in claim 14 wherein the display units are projectors.

17. The system as in claim 14 wherein the display units are flat panel displays.

18. The system as in claim 14 wherein the settings include at least one of warp, blend and OMTE parameters.

19. The system as in claim 14 wherein the settings include warp, and the means for using a change in at least one of the plurality of settings maintains values of the warp that are regularly in use in a set state, whereby a number of times that a state of the warp is changed is minimized.

20. The system as in claim 14 wherein the settings include color correction, and the means for using a change in at least one of the plurality of settings maintains values of the color correction that are regularly in use in a set state, whereby a number of times that a state of the color correction is changed is minimized.

* * * * *